United States Patent [19]

Fellrath et al.

[11] 4,259,600
[45] Mar. 31, 1981

[54] INTEGRATED INSULATED-GATE FIELD-EFFECT TRANSISTOR CONTROL DEVICE

[75] Inventors: Jean Fellrath, Neuchatel; Eric Vittoz, Cernier, both of Switzerland

[73] Assignee: Centre Electronique Horloger S.A., Neuchatel, Switzerland

[21] Appl. No.: 919,320

[22] Filed: Jun. 26, 1978

[30] Foreign Application Priority Data

Jun. 27, 1977 [CH] Switzerland .......................... 7846/77

[51] Int. Cl.³ ...................... H02M 1/08; H02M 7/10; H03K 5/02; G04C 13/00
[52] U.S. Cl. ................................... 307/270; 307/264; 363/61; 368/87; 368/219
[58] Field of Search ................. 307/264, 268, DIG. 1, 307/DIG. 4, 270; 58/23 A, 23 DR; 363/60, 61

[56] References Cited

U.S. PATENT DOCUMENTS

| | | | |
|---|---|---|---|
| 3,631,259 | 12/1971 | Kiyota et al. | 363/60 X |
| 3,818,484 | 6/1974 | Nakamura et al. | 363/60 X |
| 3,821,627 | 6/1974 | Milovancevic | 363/60 |
| 3,992,868 | 11/1976 | Tamaru et al. | 58/23 BA X |
| 4,124,806 | 11/1978 | Rusznyak | 58/23 BA X |

FOREIGN PATENT DOCUMENTS

| | | | |
|---|---|---|---|
| 2347404 | 4/1974 | Fed. Rep. of Germany | 307/DIG. 4 |
| 2365581 | 9/1975 | Fed. Rep. of Germany | 307/DIG. 4 |
| 2639554 | 3/1977 | Fed. Rep. of Germany | 363/61 |

OTHER PUBLICATIONS

Vittoz et al., *IEEE Journal of Solid-State Circuits*, vol. SC-7, No. 2, 4/1972, pp. 100-104.

*Primary Examiner*—Larry N. Anagnos
*Attorney, Agent, or Firm*—Cushman, Darby & Cushman

[57] ABSTRACT

An integrated control device for controlling a device such as a LED display or a miniature stepping motor for an electronic watch comprises at least one insulated-gate field effect transistor for controlling the supply of current to the element. The gate of the F.E.T. is connected to a control circuit including a voltage multiplier comprising a series-connected chain of rectifiers and a plurality of capacitors connected between the respective junctions between rectifiers and alternate inputs. High frequency signals of opposite phase are supplied to the inputs under control of an input control signal. Circuit means are provided for starting the action of the voltage multiplier at the beginning of an input control signal and for short-circuiting the output of the control circuit at the end of an input control signal.

4 Claims, 7 Drawing Figures

INTEGRATED INSULATED-GATE FIELD-EFFECT TRANSISTOR CONTROL DEVICE

BACKGROUND OF THE INVENTION

1. Field of the Invention

The present invention relates to an integrated, insulated-gate, field-effect transistor control device comprising at least one power transistor whose conduction path is connected in series with the device to be controlled between the terminals of a power supply and a control circuit having at least one input connected to a source of input control signals, and having an output connected to the gate of the said power transistor thereby applying to it control signals at a higher voltage than that of the input control signals and of the power supply.

2. Description of the Prior Art

Numerous circuits for apparatus of small volume such as watches and pocket calculators are fed by batteries. The voltage is then limited to a few volts if one does not want to assign too much space to the batteries. For example, the display devices, the micro-motor of a watch or light emitting diodes of the display in a calculator require relatively large currents.

The power transistors used for controlling an external device at a high current, such as for example a stepping motor or an LED display, are usually controlled by a device generating relatively low-voltage control signals. These power transistors designed for low-voltage control occupy a large portion of the total surface of the integrated circuit, which is a major drawback so far as cost and production efficiency are concerned.

It has already been suggested (French patent application No. 2 332 646), in order to control n-type MOS transistors, to increase the control voltage by means of a control circuit comprising a storage capacitor. This circuit however requires a capacity whose value is much higher than the capacities of the gates of the transistors to be controlled so that, in practice, it is not suitable for being integrated. On the other hand, the increase in the voltage which can be obtained is limited.

Furthermore, voltage multipliers using Schottky diodes and external capacities (U.S. Pat. No. 3,818,484) are known in integrated control devices for liquid crystal display devices. These multipliers are conceived for providing the necessary supply of power to these display devices and their control circuits, which conditions the way in which they are produced and makes very important the power output obtained.

SUMMARY OF THE INVENTION

An object of the invention is to provide a control device which makes it possible to reduce to a large extent the surface required by power transistors and to produce power transistors with good efficiency comparable with that of transistors of current dimensions, and to use fully integrated circuits for controlling these transistors.

To this end, the device in accordance with the invention is characterized in that the control circuit comprises at least one voltage multiplier including a chain of rectifier elements the conduction paths of which are connected in series, in the same direction, between a first input connection and an output connection of the voltage multiplier, and storage capacities connected between the common consecutive connection points of these rectifier elements and, alternatively, the said first input connection and a second input connection of the voltage multiplier, means for ensuring that the signals applied to the said first and second input connections are in phase opposition, and that the control circuit comprises a device generating a periodic control voltage having a period at least several times shorter than the duration of an input control signal and comprises means for starting the action of the voltage multiplier at the beginning of the duration of each input control signal and for short-circuiting the output of the voltage multiplier at the end of the duration of each input control signal.

The dimension of the power transistors can be considerably reduced if the control voltage to be applied to the gate of these transistors is increased. This is obtained according to the invention by means of voltage multipliers including very small capacities and produced entirely by integrated technology. These multipliers permit considerable increase in the control voltage and, since they control the gate of the MOS transistors, practically no energy is to be supplied by them.

It should be noted that the use of voltage multipliers in accordance with the invention reduces the rise time of the control signals of the power transistors. In the case in which the high voltage produced in the voltage multiplier is alternately applied to different power transistors, a temporary high voltage drop occurs upon each control. However, it appears that, for example in a display control, the rise time of the control signal of the power transistors can be substantially prolonged with respect to the usual control signals. Optimization of the integrated control circuit thus makes it possible to meet the requirements imposed by the display while obtaining an important reduction in space.

The advantages which can be obtained by the invention unclude the following: Surface reduction of the power transistors by about a factor 4, which makes it possible to locate a larger number of circuits on an integrated circuit chip and to substantially increase the production and efficiency, the probability of fault on a circuit being a rapidly increasing function of its surface. This results in a substantial decrease in cost of production. Moreover, certain circuits comprising a large number of power transistors at present have to be produced in several small chips. The invention makes it possible to provide the same circuit with a reduced number of chips, often even in a single chip. The resulting decrease in the number of contacts gives rise to a new reduction in costs and an increase in reliability.

BRIEF DESCRIPTION OF THE DRAWINGS

Various embodiments of a device in accordance with the invention are described below by way of examples with reference to the accompanying drawings, in which.

DESCRIPTION OF THE PREFERRED EMBODIMENTS

Figure 1:
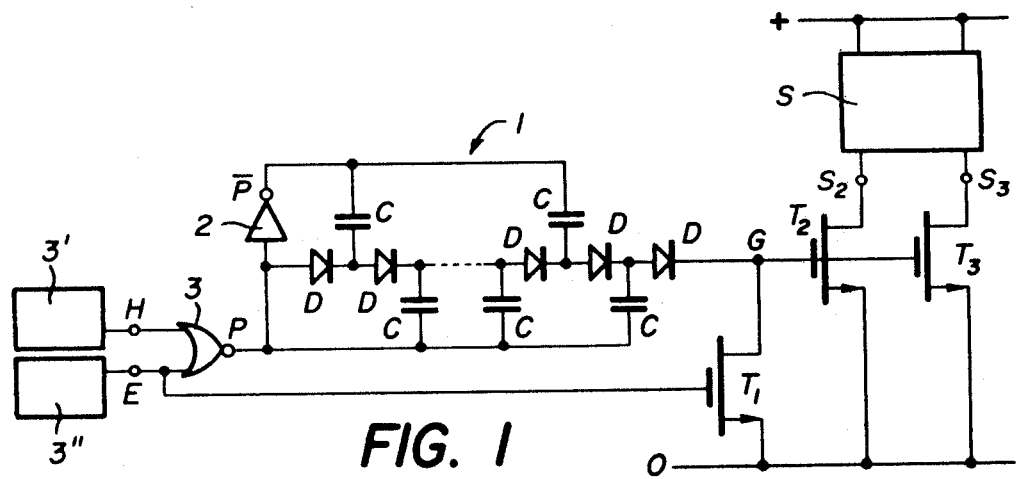
FIG. 1 is a direct control device for power transistors including a voltage multiplier.

The device shown in FIG. 1 comprises two power transistors $T_2$, $T_3$ whose conduction paths are connected to respective points $S_2$ and $S_3$ in series with a device to be controlled shown by a block S across the terminals O and + of a supply voltage source.

The gates of these n-channel power transistors are connected to each other at a point G at the output of a voltage multiplier 1 generating a positive voltage. This multiplier comprises a chain of diodes D and storage capacitors C connected across the common connection points of the diodes and alternatively to two input connections P, $\bar{P}$. The operating principle of such a voltage multiplier is described in an article by John F. Dickson "On-Chip High-Voltage Generation in MNOS Integrated Circuits Using an Improved Voltage Multiplier Technique", in the IEEE Journal of Solid-State Circuits, Vol. SC-11, No. 3, June 1976, p. 374–378.

The two inputs P, $\bar{P}$ are connected to each other through an inverter 2 which ensures that the signals applied to the input P are in phase opposition at the input $\bar{P}$. The input P is connected to the output of a selection circuit comprising a logic coincidence circuit of NAND type, 3, having two inputs H and E. The input H is connected to a device 3' which provides a high-frequency control voltage, and the input E is connected to a source 3" of low-voltage input control signals. These signals are also applied to the gate of a discharge transistor $T_1$ whose conduction path is connected between the point G and the terminal O of the voltage source.

Figure 2:
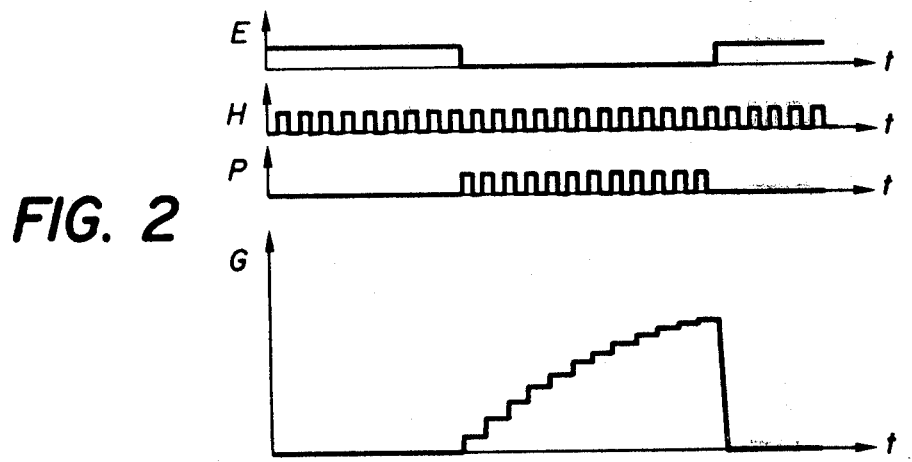
FIG. 2 is a diagram illustrating the signals at different points of the device of FIG. 1.

The operation of the circuit is illustrated by chronogrammes in FIG. 2. The line E shows a low-voltage input control signal applied to the input E in the form of a rectangular impulse having a descending leading edge. The second input H is connected to the control voltage source 3' providing for example high-frequency rectangular impulses. At the output P of the coincidence circuit a low-voltage signal is provided which is illustrated by a line P, has the same duration as the signal at E, and is formed by a succession of high-frequency impulses. The voltage multiplier generates at its output G a high-voltage control signal having a waveform shown by a line G. The rise time of this signal is inversely proportional to the frequency of the signal applied to H and the capacity C of the multiplier.

It is found that for a given rise time an optimum multiplication factor exists which corresponds to a minimum of surface occupied by the whole control device. Furthermore, as high as possible a value will be chosen for the frequency of the control signal applied to the multiplier. In certain cases, this frequency is already available in the apparatus comprising the control device and sometimes even the two opposite phases are directly available so that in given embodiments of the device according to the invention, the inverter at the inputs of the multiplier may be eliminated. It is also possible to use a separate oscillator, thereby making it possible to freely choose the frequency of the control signal.

The surface gain of the integrated circuit of the control device in accordance with the present invention can be illustrated by a practical example of a motor controlled by the circuit of FIG. 1. In this example, the frequency of the control signal H is 32 kHz, the number of stages of the voltage multiplier is 10, the storage capacity C=0.5 pF, the voltage Vm of the output signal of the multiplier is 10 V with a rise time of 6 m.sec. and an equivalent internal resistance of 550 MΩ. The current of the motor is 0.75 mA, the supply voltage is 1.35 V, and the conductance presented in the transistor must not be less than 0.01 S. A transistor whose threshold voltage is $V_T$ and whose gain is $\beta$ is equivalent to a conductance $G_D=\beta(V_G-V_T)$ if the drain voltage is small (<0.1 V) and if a gate voltage $V_G$ is applied to it.

In the case of a first transistor having a gain $\beta_1$ controlled in the conventional manner, the gate voltage $V_G$ cannot exceed the supply voltage $V_{DD}=1.35$ V. The threshold voltage $V_T$ is close to 0.7 V. The gain $\beta_1$ must then be $\beta_1=G_D/(V_{DD}-V_T)=15.4$ mA/V.

In the case of a second transistor controlled by a higher voltage $V_m=10$ V which is obtained by way of a voltage multiplier, it will have the same conductance as the first one if its gain is $\beta_2=G_D/(V_m-V_T)=1.08$ mA/V. The gain ratio of these two transistors is then $\beta_2/\beta_1=(V_{DD}-V_T)/(V_m-V_T)=0.07$. The surface ratio of these two transistors is substantially equal to the gain ratio. In this example, the total surface occupied by a power transistor and the voltage multiplier is approximately equal to 25% of the surface necessary for a low-voltage controlled power transistor.

Figure 3:
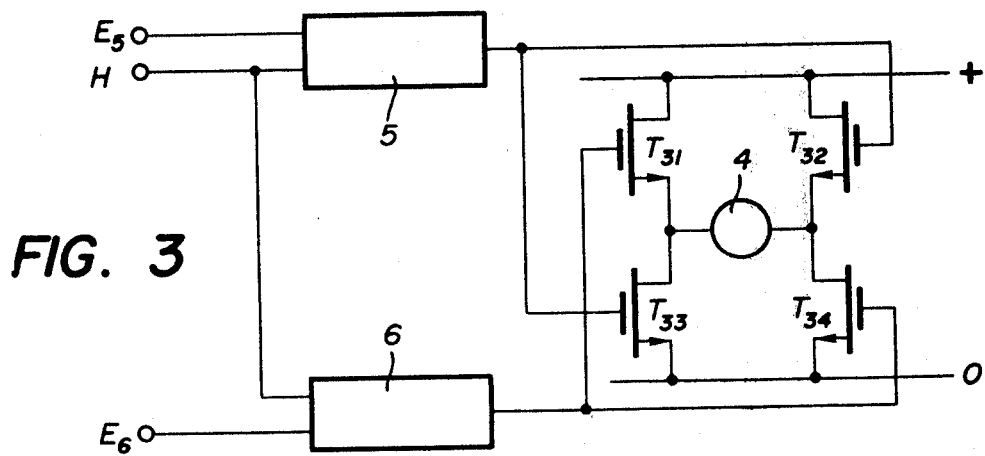
FIG. 3 is a circuit diagram of a control device for a stepping motor.

FIG. 3 illustrates a particularly advantageous embodiment in which the control device comprises pairs of n-channel power transistors of the same type instead of complementary transistors. As known, the n-channel transistors occupy a smaller surface than the p-channel transistors, for the same values of drain current and gate voltage. The illustrated device controls a stepping motor by means of two pairs of transistors $T_{31}$, $T_{32}$, $T_{33}$ and $T_{34}$ connected in series to the terminals +, O of a supply voltage source. The winding of the motor is connected to the common connection points of the transistors of each pair and the transistors $T_{32}$, $T_{33}$ and $T_{31}$, $T_{34}$ belonging to different pairs and being connected to different terminals of the voltage source are simultaneously controlled by respective units 5 and 6. Each unit comprises a voltage multiplier and a selection circuit in the form of a coincidence gate such as that mentioned in connection with FIG. 1. A high-frequency control signal is applied at H simultaneously to first inputs of the units 5 and 6 and the low-voltage input control signals are applied to second inputs $E_5$ and $E_6$ of these units.

This embodiment thus uses only two voltage multipliers instead of four for four power transistors which are all of the same type.

Figure 4:
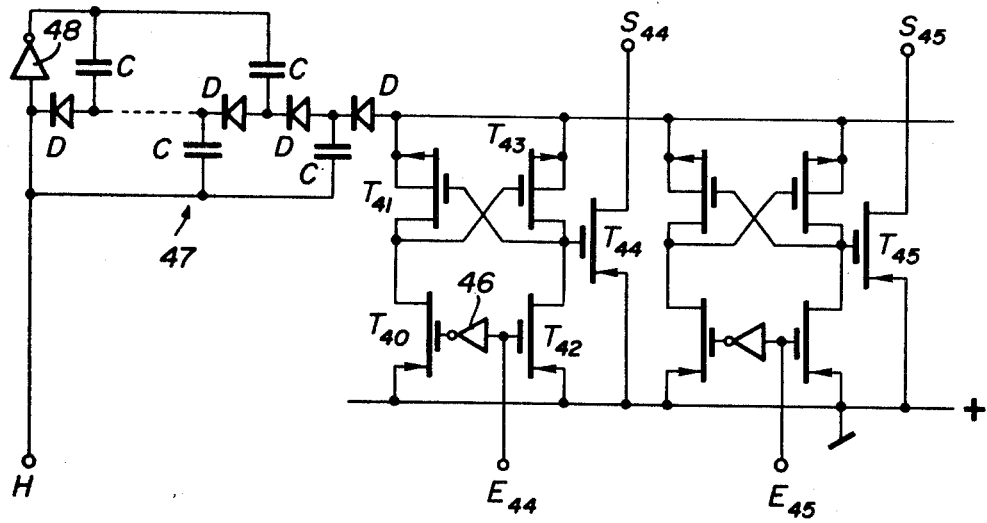
FIG. 4 is a circuit diagram of a device providing distribution of the control voltage to various p-channel power transistors.
Figure 5:
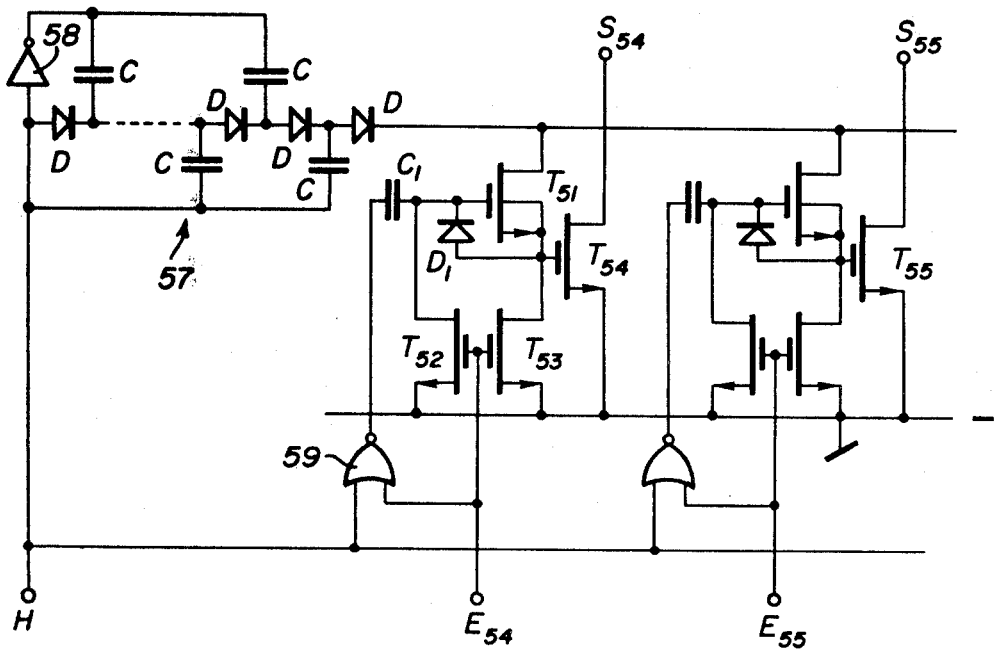
FIG. 5 is the circuit diagram of a similar device with distribution of the control voltage to various n-channel power transistors.

FIGS. 4 and 5 illustrate another embodiment of the control device, in which use is made of a single voltage multiplier for various power transistors which are not to be controlled simultaneously. The high-voltage control signal generated by this voltage multiplier is thus distributed by means of selection circuits. Depending upon whether one is dealing with p-channel or n-channel power transistors, the preferred embodiment of these circuits differs. In the CMOS technique used, the p-transistors are formed in the substrate and the n-transistors in at least one p-well. Different potentials can be applied to different p-wells, while the substrate is always in common.

FIG. 4 shows a device having p-channel power transistors $T_{44}$, $T_{45}$, ... whose source is connected to the positive pole of the voltage source which corresponds in this case to the earth. The drain connections of these transistors to which the device to be controlled is connected are indicated by $S_{44}$, $S_{45}$, etc.

The various low-voltage input control signals are applied at $E_{44}$, $E_{45}$, etc. to the selection circuits connected to the respective power transistors. Each selection circuit comprises two pairs of complementary transistors such as $T_{40}$, $T_{41}$ and $T_{42}$, $T_{43}$ which form a bistable arrangement. The gate of each of the n-channel transistors such as $T_{41}$, $T_{43}$ is connected to the drains of the other transistors and the gates of the p-channel transistor pair such as $T_{40}$, $T_{42}$ are connected, respectively, through an inverter 46 and directly to a low-voltage input connection such as $E_{44}$. The n-channel transistors are formed in a separate p-well connected to their sources and to the output of a voltage multiplier 47 similar to that of FIG. 1, with a reverse polarity of the diodes, so as to provide a high negative voltage. The high-frequency signal is applied at H to the inputs of this multiplier, these inputs being connected to each other through an inverter 48, should the signal not be available in the direct and inverted form.

During operation, when a negative potential is applied for example at $E_{44}$, the transistors $T_{42}$ and $T_{41}$ become conductive, while the transistors $T_{40}$ and $T_{43}$, and thus the transistor $T_{44}$, are blocked. When a positive potential is applied to $E_{44}$, the transistors $T_{42}$ and $T_{41}$ are blocked, the transistors $T_{40}$ and $T_{43}$ become conductive, and the high voltage of the voltage multiplier is applied to the gate of the transistor $T_{44}$. This voltage drops to the point at which switching to the other stable state occurs and raises then with a time constant determined by the components of the circuit and the frequency of the voltage applied at H.

Since the voltage multiplier has a high internal resistance, the operation of the selection circuit is ensured by transistors with minimum dimensions.

The device of FIG. 5 permits a positive control voltage produced by a voltage multiplier 57 to be applied to the gates of n-channel power transistors such as $T_{54}$, $T_{55}$ when low-voltage input control signals are applied to the input connections $E_{54}$, $E_{55}$. The transistors $T_{54}$ and $T_{55}$ have their sources connected to earth which here corresponds to the negative pole of the voltage source, the drains of these transistors being connected at $S_{54}$, $S_{55}$ to the device to be controlled.

Each selection device connected to a respective power transistor comprises a first n-channel transistor $T_{51}$ whose drain is connected to the output of the voltage multiplier, a diode $D_1$ connected across the gate and the source of the transistor $T_{51}$, and a capacitor $C_1$ connected to the gate of the transistor $T_{51}$, as well as two n-channel discharge transistors $T_{52}$ and $T_{53}$ whose conduction paths are connected, on the one hand, to the earth and, on the other hand, to the gate and the source of the transistor $T_{51}$.

The input control signal is applied to the gates of the transistors $T_{52}$ and $T_{53}$ and to one of the two inputs of the coincidence circuit 59. The other input of the circuit 59 is connected at H to the device which provides a high-frequency control voltage. Moreover, the inputs of the voltage multiplier, which are connected to one another through an inverter 58, are connected to the input H. The output of the circuit 59 is connected through the capacitor $C_1$ to the gate of the transistor $T_{51}$.

In the device of FIG. 5, the low-voltage input control signal is thus applied as a signal chopped at the frequency of the voltage provided at H to the gate of the transistor $T_{51}$. The capacitor $C_1$ may have a small capacity but its capacity must be greater than the capacity of the gate of the transistor $T_{51}$. The chopped control signal is blocked by means of a diode $D_1$ at the level of the gate voltage of the transistor $T_{54}$. The transistor $T_{51}$ then conducts and charges the gate-source capacity of the transistor $T_{54}$ (not shown) by bootstrap effect at the level of the high voltage provided by the voltage multiplier. Owing to the high internal resistance of the multiplier, its output voltage practically drops to zero at the beginning of each input control signal, and then rises to its nominal value.

Figure 6:
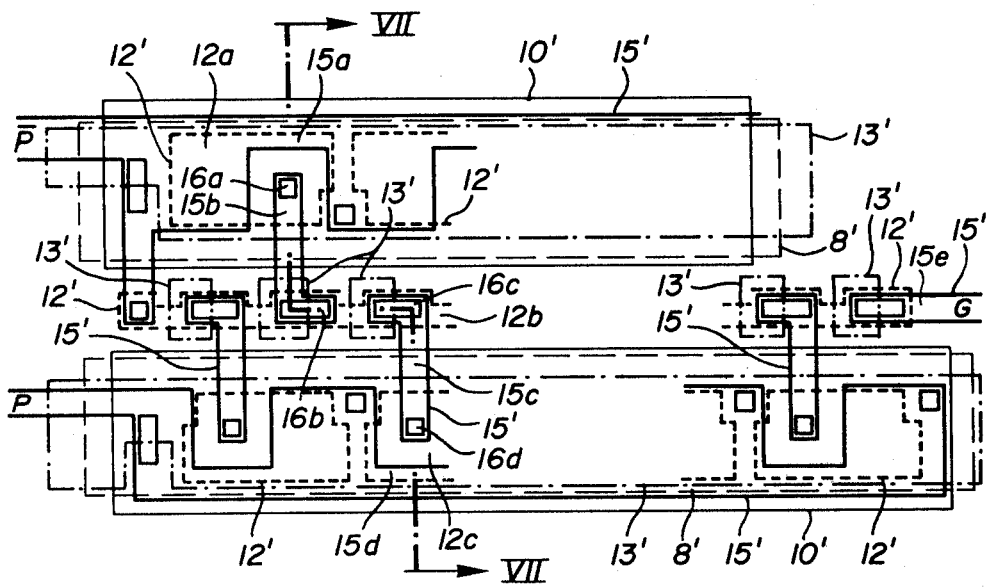
FIG. 6 is a partial view of a mask layout used for the production of the voltage multiplier portion of the device of FIG. 1.
Figure 7:
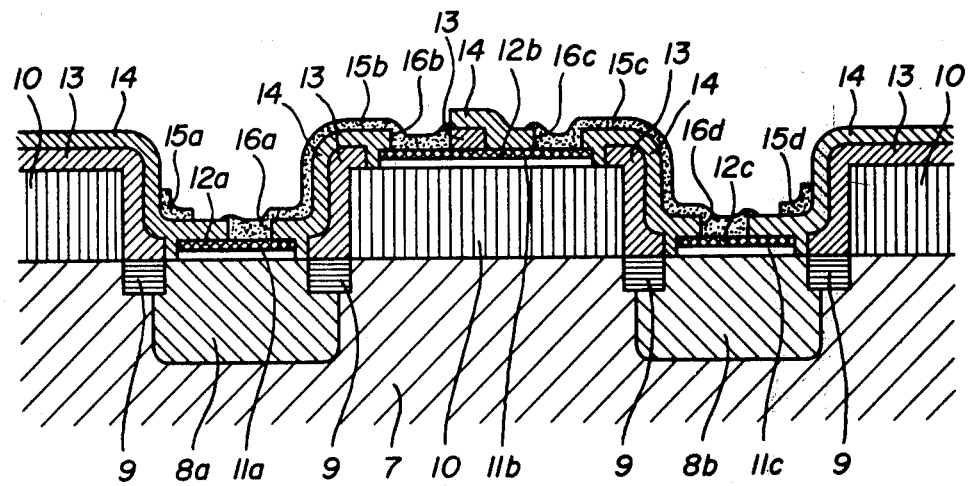
FIG. 7 is a diagrammatic cross-sectional view taken along the line VII—VII of the voltage multiplier shown in FIG. 6.

FIGS. 6 and 7 illustrate by way of example an embodiment of the voltage multiplier illustrated in the circuit diagram of FIG. 1.

This multiplier is realised by a known integrated circuit technology as described f.i. in the article "Silicon Gate CMOS Frequency Divider for the Electronic Wrist Watch" by E. Vittoz, B. Gerber and F. Lenenberger, published in IEEE Journal of Solid State Circuits, 7, 100 (1972). This technology allows the realisation of polycrystalline silicon-gate CMOS transistors. Doped oxides are used for selectively doping the source, drain and gate regions of the transistors. When a polycrystalline silicon layer is placed under a bordering region between a boron-doped oxide and a phosphorus-doped oxide, a floating diode is formed at that border, as described in USA-patent 4041522.

The integrated circuit implementation of the multiplier shown in FIGS. 6 (partial mask layout) and 7 (cross-sectional view) comprises an n-doped substrate 7 of monocrystalline silicon containing two p-doped wells $8a$ and $8b$ which are obtained in a manner known per se by using a mask having openings whose outline is indicated by the lines 8' in FIG. 6.

The substrate 7 is covered by a layer 10 of silicon oxide having a thickness of approximately 1 micron, the layer having rectangular recesses formed by etching the layer also in a manner known per se, the parts to be preserved being covered by a mask having openings whose outline is indicated by lines 10' in FIG. 6.

The layer 10 is partly covered by a layer 13 of boron-doped silicon oxide (p-doped oxide) having a thickness of approximately 0.2 microns and obtained in a manner known per se by using a mask which leaves uncovered the zones external to those whose contours are indicated by the lines 13' in FIG. 6.

Two p-type diffusion strips 9 are formed in the substrate 7 and the p-wells $8a$ and $8b$ on each side of the p-wells in the part of the surface of the substrate delimited by the lines 10' and 13' (FIG. 6).

The p-wells $8a$ and $8b$ and the portion of layer 10 between these p-wells are respectively partly covered by a non-doped silicon oxide layer $11a$, $11c$ and $11b$ acting as gate oxide. The layers $11a$, $11b$ and $11c$ are in turn covered by polycrystalline silicon electrodes $12a$, $12b$ and $12c$ obtained by deposition by making use of a mask having openings whose contours are indicated by the lines 12' in FIG. 6.

A layer 14 of phosphorus-doped silicon oxide (n-doped oxide) covers the layer 13 and the layers $12a$, $12b$, $12c$ (except certain zones such as $16a$, $16b$, and $16d$ in which contact openings are formed) and the parts of the surface of the caissons 8a and 8b and the layer 10 not covered by the silicon oxide layer 11a, 11b and 11c.

A metal layer consisting of a metal which is a good conductor and little oxidizable, e.g. aluminum, formed by distinct zones such as 15a, 15b, 15c and 15d ensures electric connection between the polycrystalline silicon electrodes 12a, 12b and 12c.

This metal layer may be obtained by metallisation under vacuum in a manner known per se by making use of a mask having openings whose contours are indicated by the lines 15' in FIG. 6.

The zone 15a and the zone 15d of this metal layer are respectively connected to the input connection $\bar{P}$ and the input connection P of the voltage multiplier 1 (FIG. 1), the electrode 12b being connected to the output point of the voltage multiplier 1 by way of a zone 15e of the same metal layer connected to the end of this electrode facing the side of the connections $\bar{P}$ and P.

Comparison between FIG. 1 and FIGS. 6 and 7 shows that the electrode 12b connects in series a line of polycrystalline silicon diodes each of which is located in a contact opening such as 16b and 16c. It will also be noted that the p-wells 8a and 8b form electrodes common to the two capacity groups of the multiplier 1 whose electrodes 12a and 12c form the other electrodes.

It will also be noted that the dielectrics of the capacitors C (FIG. 1) are formed by silicon oxide layers 11a and 11c. These layers preferably have a very small thickness, for example of the order of 0.1 micron, which makes it possible to obtain a high specific capacity for the capacitors C. The presence of the metallisation layer (15b, 15c) above the polycrystalline silicon layers (12a, 12c) also assists in increasing the value of this specific capacity.

Moreover, the diodes D (FIG. 1) are placed above a thick layer 10 of silicon oxide, and thus are well insulated from the remainder of the circuit.

Finally, the cross-section illustrated in FIG. 7 shows that the formation of a parasitic channel short-circuiting the p-wells 8a and 8b, owing to the presence of a parasitic transistor having as its source and drain these two caissons and as its gate the metallisation and the diodes, is prevented owing to the presence of the diffusion strips 9 which act as "channel stoppers".

The technique of complementary silicon-gate MOS transistors thus makes it possible to solve in particularly advantageous way the problem of producing the voltage multiplier used in the device in accordance with the present invention. Use is made in particular of polycrystalline silicon diodes which are floating. The capacitors C of the voltage multiplier are obtained by connecting in parallel polycrystalline silicon-well capacitors on thin oxide and polycrystalline silicon-metal capacitors. The only parasitic capacitors are the caisson-substrate capacitors which load the device generating the high-frequency control signal without affecting the operation of the multiplier.

We claim:

1. An integrated insulated-gate field-effect transistor control device comprising output terminals, at least one power transistor having a conduction path and a control electrode, terminals for connection to a power supply, a source of input control signals, and a control circuit having at least one input and an output and comprising: at least one voltage multiplier having first and second input connections and an output connection and formed by a chain of rectifier elements having conduction paths and connection points therebetween and a plurality of storage capacitors arranged in first and second sets and each having first and second terminals; means for providing signals in phase opposition; a generator for generating high frequency voltage pulses and having an output; and circuit means including a coincidence circuit having first and second inputs and an output, wherein said conduction path of said at least one power transistor is connected in series with said output terminals between said terminals of said power supply, said input of said control circuit is connected to said source of input control signals and said output of said control circuit is connected to said control electrode of said power transistor to apply thereto control signals at a higher voltage than that of said input control signals and than that of the power supply, said conduction paths of said rectifier elements of said chain of said at least one voltage multiplier being connected in series in the same direction between said first input connection and said output connection of said voltage multiplier, said first terminals of said storage capacitors being connected to respective ones of said connection points between said rectifier elements, said first set of said storage capacitors comprising alternate storage capacitors whose second terminals are connected to said first input connection of said voltage multiplier and said second set of capacitors having their second terminals connected to said second input connection thereof, said first and second input connections of said voltage multiplier being connected to said means for providing signals in phase opposition, said generator being arranged to generate said high frequency voltage pulses having a period at least several times shorter than the duration of an input control signal, said first input of said coincidence circuit being connected to said source of input control signals, said second input of said coincidence circuit being connected to the output of said generator and said first input connection of said voltage multiplier, said output of said voltage multiplier being connected to said control electrode of said power transistor, and said circuit means further comprise a discharge transistor having a conduction path and a control electrode, said conduction path of said discharge transistor being coupled to the control electrode of said power transistor, said control electrode of said discharge transistor being connected to said source of input control signals, whereby the capacitance of the control electrode of said power transistor is discharged at the end of the duration of each input control signal.

2. An integrated insulated-gate field-effect transistor control device comprising output terminals, at least two P-channel power transistors having each a conduction path and a control electrode, terminals for connection to a power supply, a source of input control signals, and a control circuit having at least one input and two outputs and comprising: at least one voltage multiplier circuit having first and second input connections and an output connection and formed by a chain of rectifier elements having conduction paths and connection points therebetween and a plurality of storage capacitors arranged in first and second sets and each having first and second terminals; means for providing signals in phase opposition; a generator for generating a periodic control voltage and having an output; and circuit means including at least two selection circuits and having first and second input connections and an output connection, wherein said conduction path of each of said power transistors is connected in series with said output terminals between said terminals of said power supply, said input of said control circuit is connected to said source of input control signals and said outputs of said control circuit are connected to said control electrodes of said power transistors to apply thereto control signals at a higher voltage than that of said input control signals and than that of the power supply, said conduction paths of said rectifier elements of said chain of said at least one voltage multiplier being connected in series in the same direction between said first input connection and said output connection of said voltage multiplier, said first terminals of said storage capacitors being connected to respective ones of said connection points between said rectifier elements, said first set of said storage capacitors comprising alternate storage capacitors whose second terminals are connected to said first input connection of said voltage multiplier and said second set of capacitors having their second terminals connected to said second input connection thereof, said first and second input connections of said voltage multiplier being connected to said means for providing signals in phase opposition, said generator being arranged to generate said periodic control voltage having a period at least several times shorter than the duration of an input control signal, said first inputs of said selection circuits being connected to said source of input control signals, each of said selection circuits including two pairs of complementary MOS transistors connected, on the one hand, to the output of a voltage multiplier common to the selection circuits and arranged to generate a negative voltage and, on the other hand, to the positive terminal of said power supply, the control electrode of the n-transistor of each pair being connected to the connection point common to the drains of the n and p transistors of the other pair, the control electrodes of the p-transistors having means for ensuring that input control signals applied thereto are in phase opposition, and the drains of one of the pairs of transistors being connected to the control electrode of a respective power transistor, said first input connection of the voltage multiplier being connected to the generator for generating high frequency voltage pulses.

3. An integrated insulated-gate field-effect transistor control device comprising output terminals, at least two N-channel power transistors having each a conduction path and a control electrode, terminals for connection to a power supply, a source of input control signals, and a control circuit having at least one input and two outputs and comprising: at least one voltage multiplier circuit having first and second input connections and an output connection and formed by a chain of rectifier elements having conduction paths and connection points therebetween and a plurality of storage capacitors arranged in first and second sets and each having first and second terminals; means for providing signals in phase opposition; a generator for generating a periodic control voltage and having an output; and circuit means including at least two selection circuits and having first and second input connections and an output connection, wherein said conduction path of each of said power transistors is connected in series with said output terminals between said terminals of said power supply, said input of said control circuit is connected to said source of input control signals and said outputs of said control circuit are connected to said control electrodes of said power transistors to apply thereto control signals at a higher voltage than that of said input control signals and than that of the power supply, said conduction paths of said rectifier elements of said chain of said at least one voltage multiplier being connected in series in the same direction between said first input connection and said output connection of said voltage multiplier, said first terminals of said storage capacitors being connected to respective ones of said connection points between said rectifier elements, said first set of said storage capacitors comprising alternate storage capacitors whose second terminals are connected to said first input connection of said voltage multiplier and said second set of capacitors having their second terminals connected to said second input connection thereof, said first and second input connections of said voltage multiplier being connected to said means for providing signals in phase opposition, said generator being arranged to generate said periodic control voltage having a period at least several times shorter than the duration of an input control signal, said first inputs of said selection circuits being connected to said source of input control signals, each of said at least two selection circuits having an N-channel driving transistor whose drain is connected to the output of a voltage multiplier common to the selection circuits and arranged to provide a positive voltage, the source of this transistor being connected to its control electrode through a diode and its control electrode being connected through a capacitor to the output of a logic coincidence circuit, two inputs of the said coincidence circuit being respectively connected to said generator for generating high frequency voltage pulses and to said source of input control signals, two n-channel discharge transistors being connected to each selection circuit and being connected through their control electrodes to said source of input control signals so as to respectively discharge the capacity of said control electrode of said driving transistor and the capacity of the control electrode of the corresponding power transistor, the source of said driving transistor forming said output of said selection circuit and being connected to the control electrode of the corresponding power transistor, said first input connection of said voltage multiplier being connected to said generator for generating high frequency voltage pulses.

4. An integrated insulated-gate field-effect transistor control device comprising output terminals, at least two pairs of power transistors of the same conduction type having each a conduction path and a control electrode, terminals for connection to a power supply, a source of input control signals, and a control circuit having at least one input and an output and comprising: at least one voltage multiplier circuit having first and second input connections and an output connection and formed by a chain of rectifier elements having conduction paths and connection points therebetween and a plurality of storage capacitors arranged in first and second sets and each having first and second terminals; means for providing signals in phase opposition; a generator for generating a periodic control voltage and having an output; and circuit means including a selection circuit and having first and second input connections and an output wherein said conduction paths of said power transistors are connected in series, in the same direction between said terminals of said power supply, the connection points common to each pair being the said output terminals, said input of said control circuit is connected to said source of input control signals and said output of said control circuit is connected to said control electrode of two power transistors which do not belong to the same pair and are connected to opposite terminals of said power supply, to apply to said control electrodes control signals at a higher voltage than that of said input control signals and than that of the power supply, said conduction paths of said rectifier elements of said chain of said at least one voltage multiplier being connected in series in the same direction between said first input connection and said output connection of said voltage multiplier, said first terminals of said storage capacitors being connected to respective ones of said connection points between said rectifier elements, said first set of said storage capacitors comprising alternate storage capacitors whose second terminals are connected to said first input connection of said voltage multiplier and said second set of capacitors having their second terminals connected to said second input connection thereof, said first and second input connections of said voltage multiplier being connected to said means for providing signals in phase opposition, said generator being arranged to generate said periodic control voltage having a period at least several times shorter than the duration of an input control signal, said first inputs of said selection circuits being connected to said source of input control signals and said first input connection of the voltage multiplier being connected to the output of said generator for generating high-frequency voltage pulses.

* * * * *